United States Patent [19]

Schmoock

[11] 4,358,963

[45] Nov. 16, 1982

[54] UNITARY ELECTROMAGNETIC FLOWMETER WITH SEALED COILS

[75] Inventor: Roy F. Schmoock, Yardley, Pa.

[73] Assignee: Fischer & Porter Company, Warminster, Pa.

[21] Appl. No.: 174,609

[22] Filed: Aug. 1, 1980

Related U.S. Application Data

[60] Continuation-in-part of Ser. No. 75,037, Sep. 12, 1979, Pat. No. 4,253,340, which is a continuation-in-part of Ser. No. 811,276, Jun. 29, 1977, Pat. No. 4,181,018, which is a division of Ser. No. 771,420, Feb. 23, 1977, Pat. No. 4,098,118.

[51] Int. Cl.³ ............................................. G01F 1/58
[52] U.S. Cl. ............................................. 73/861.12
[58] Field of Search ................................. 73/861.12

[56] References Cited

U.S. PATENT DOCUMENTS 3,695,104  10/1972  Mannherz et al. ............. 73/861.12
3,824,856   7/1974  Yard ............................... 73/861.12

FOREIGN PATENT DOCUMENTS 2040682  2/1972  Fed. Rep. of Germany ... 73/861.12

*Primary Examiner*—Charles A. Ruehl
*Attorney, Agent, or Firm*—Michael Ebert

[57] ABSTRACT

A compact electromagnetic flowmeter unit interposable between the flanged ends of upstream and downstream line pipes for metering fluid passing through the line, the unit being subject to compression by the flanged pipe ends to effect a fluid seal. The flowmeter is constituted by a non-magnetic metal spool of high strength whose inner surface is protectively covered by an insulating liner to provide a flow conduit for the fluid. Surrounding the spool and concentric therewith is a cylindrical housing fabricated of ferromagnetic material, the housing being formed by complementary half-pieces which include end plates that join the corresponding ends of the spool to define an annular inner chamber. Mounted adjacent the inner surface of the half-pieces at diametrically-opposed positions along a coil axis normal to the longitudinal flow axis are relatively thin coils which are shaped to conform to this surface to define electromagnets. Electrodes are supported on the spool at diametrically-opposed positions along an electrode axis at right angles to the coil axis. The inner chamber is filled with a potting compound to seal in the electromagnets and the electrodes.

7 Claims, 7 Drawing Figures

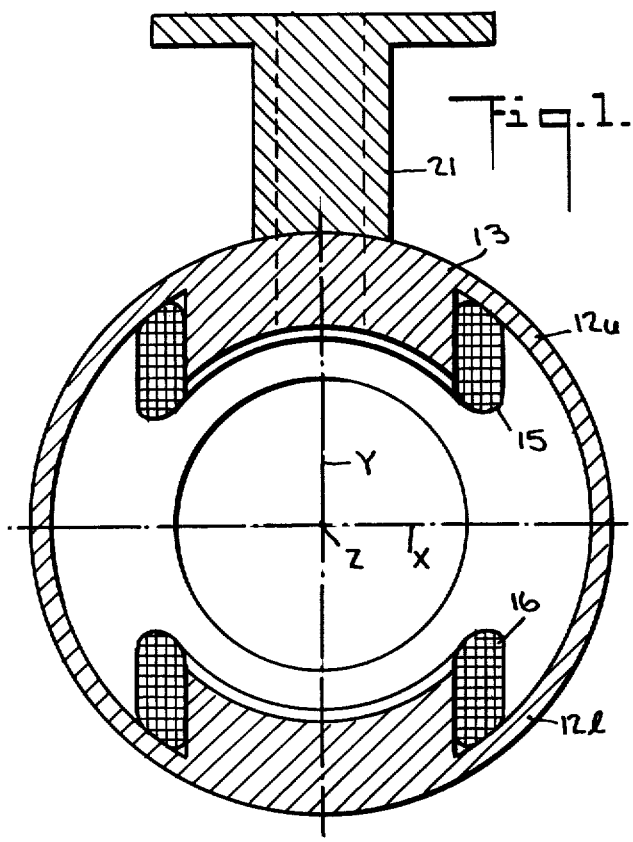
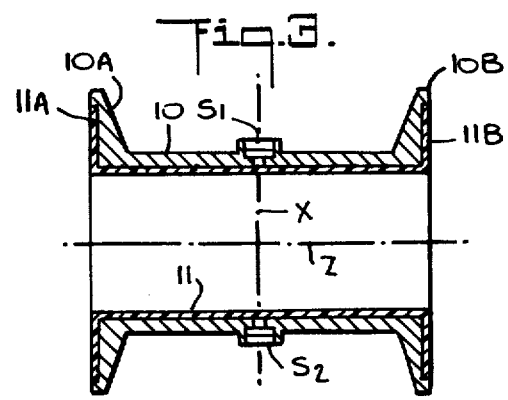
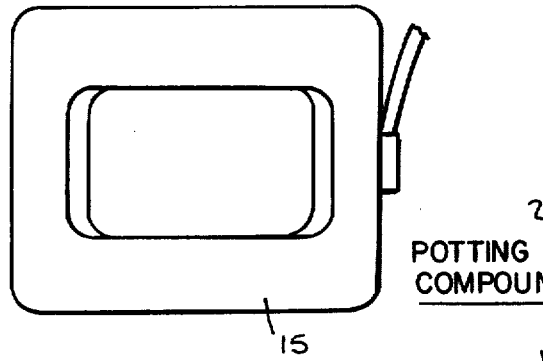
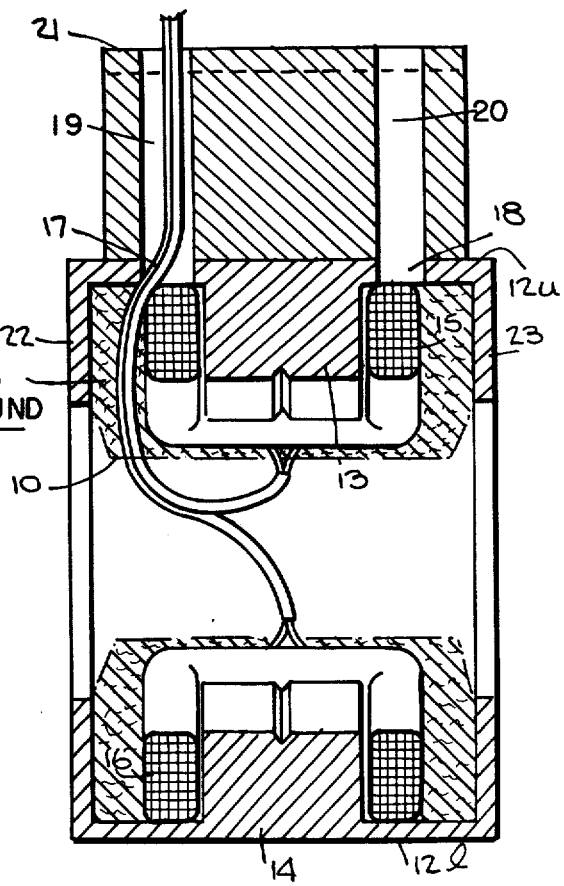

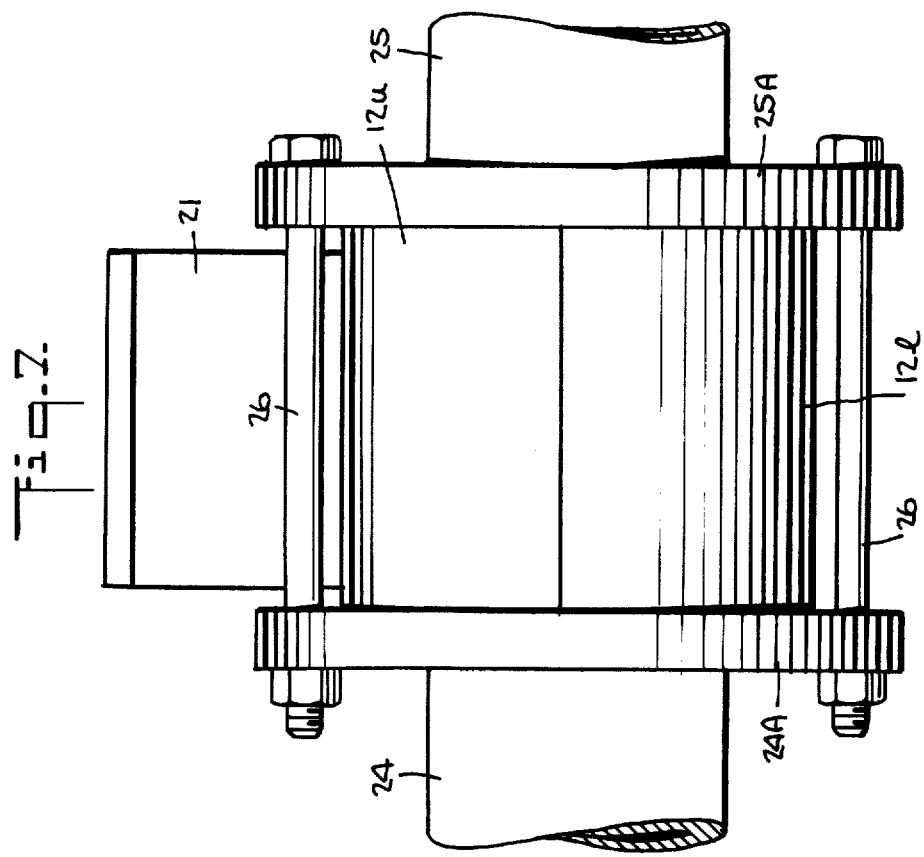
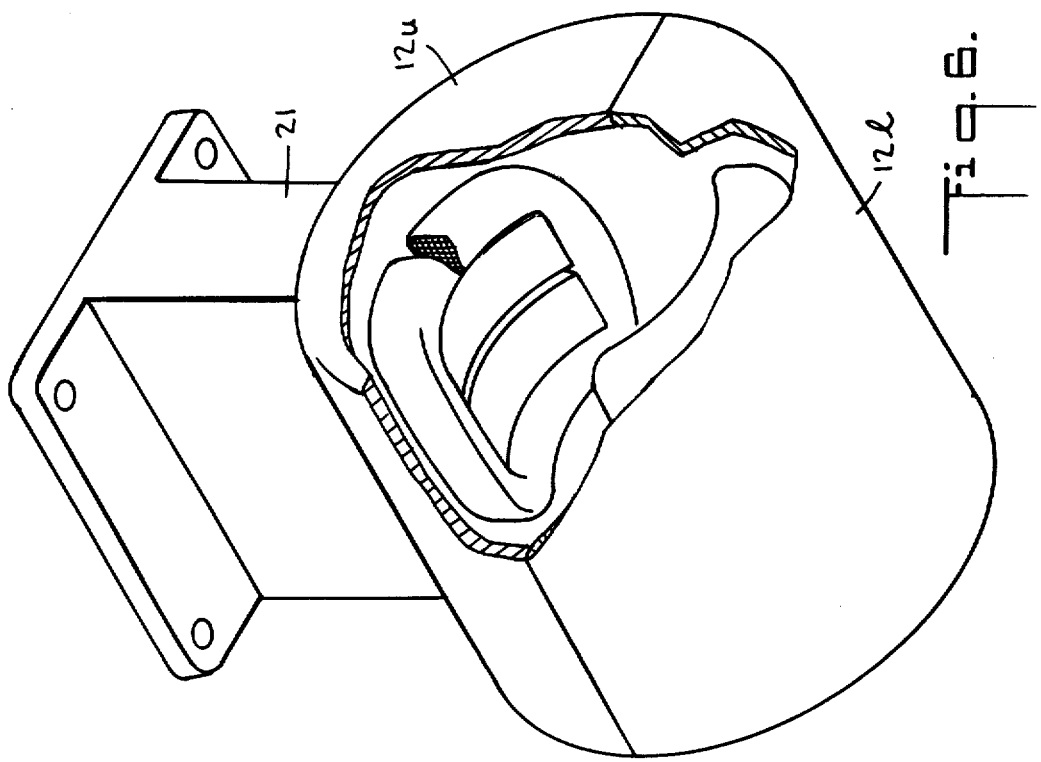

UNITARY ELECTROMAGNETIC FLOWMETER WITH SEALED COILS

RELATED CASES:

This application is a continuation-in-part of my earlier application Ser. No. 75,037 now U.S. Pat. No. 4,253,340, filed Sept. 12, 1979, which in turn is a continuation-in-part of an application Ser. No. 811,276 now U.S. Pat. No. 4,181,018, filed June 29, 1977, that is a division of an original application Ser. No. 771,420, filed February 23, 1977, now U.S. Pat. No. 4,098,118, the entire disclosures of these cases being incorporated herein by reference.

BACKGROUND OF INVENTION

This invention relates generally to electromagnetic flowmeters, and more particularly to a flangeless flowmeter having a cylindrical housing and whose components are integrated to form a highly compact, low-cost unit that may be readily installed in a flow line between the flanged ends of the upstream and downstream pipes, the flowmeter including relatively thin electromagnet coils which conform to the inner surface of the housing.

Magnetic flowmeters such as those disclosed in U.S. Pat. Nos. 3,695,104; 3,824,856; 3,783,687 and 3,965,738, are especially adapted to measure the volumetric flow rates of fluids which present difficult handling problems, such as corrosive acids, sewage and slurries. Because the instrument is free of flow obstructions, it does not tend to plug or foul.

In a magnetic flowmeter, an electromagnetic field is generated whose lines of flux are mutually perpendicular to the longitudinal axis of the flow tube through which the fluid to be metered is conducted and to the transverse axis along which the electrodes are located at diametrically-opposed positions with respect to the tube. The operating principles are based on Faraday's law of induction, which states that the voltage induced across any conductor as it moves at right angles through a magnetic field will be proportional to the velocity of that conductor. The metered fluid effectively constitutes a series of fluid conductors moving through the magnetic field; the more rapid the rate of flow, the greater the instantaneous value of the voltage established at the electrodes.

The typical commercially-available magnetic flowmeter is provided with mounting flanges at either end thereof. The meter is interposed between the upstream and downstream pipes of a fluid line, each pipe having an end flange. The mounting flanges on the meter are bolted to the flanges of line pipes. It is, of course, essential that the circle of bolt holes on the mounting flanges of the meter match those on the pipe flanges.

In a magnetic flowmeter, the flow tube is subjected to the same fluid pressure as the line pipes. The flow tube must therefore be of a material and of a thickness sufficient to withstand this pressure, even though the strength of the flow tube is unrelated to its measuring function. This design factor contributes significantly to the cost of a standard meter. Existing meters are made up of components that must be assembled are generally of substantial size and weight and quite expensive to manufacture.

In order to provide a compact and readily installable electromagnetic flowmeter whose weight and dimensions are substantially smaller than existing types, the above-identified related patent applications disclose highly compact flangeless flowmeters which, despite their reduced volume and weight, are capable of withstanding high fluid pressures, the flowmeters operating efficiently and reliably to accurately measure flow rates.

The flangeless flowmeters disclosed in these related cases are interposable between the flanged ends of upstream and downstream line pipes to meter fluid passing through the line. In one preferred embodiment, the meter is constituted by a ferromagnetic ring within which a pair of electromagnet coils is supported at opposed positions along a diametrical axis normal to the longitudinal axis of the ring, the longitudinal axis passing through the central flow passage of an annular pressure vessel which is formed of high strength insulating material and is molded within the ring to encapsulate the coils as well as a pair of electrodes disposed at diametrically-opposed positions with respect to the passage along a transverse axis at right angles to the coil axis to define a unitary structure. The unit is compressible between the end flanges of the pipes by bridging bolts that pass through bore holes in the pressure vessel or which lie outside of the ring to encage the unit.

My related patent application No. 75,037 discloses a flangeless flowmeter interposable between the flanged ends of upstream and downstream pipes in a fluid line for metering fluid passing therethrough, the meter including a non-magnetic metal spool of high mechanical strength which functions as a flow conduit and also renders the meter capable of withstanding high compressive forces as well as fluid pressure. This non-magnetic metal spool is surrounded by a ferromagnetic housing which acts as a mold for potting the inner chamber defined between the spool and the housing and thereby sealing the components contained therein. The housing also serves as the magnetic flux return path for the electromagnets supported thereby.

The housing in this related case is formed by complementary half-pieces which include end plates that join the corresponding ends of the spool to define the inner chamber. Integral with the half-pieces are two magnet cores which extend at diametrically opposed positions along an axis normal to the longitudinal axis of the cylindrical housing, the cores being surrounded by coils to define solenoid-type electromagnets. Mounted on the spool at diametrically opposed positions along a transverse axis at right angles to the core axis are two electrodes.

Thus in my prior arrangement, the electromagnetic field is produced by a pair of cored solenoids occupying diametrically-opposed positions with respect to the longitudinal axis of the flow conduit, the cores being magnetically coupled by the ferromagnetic housing. The air gap which exists between the pole faces of these cores depends on the diameter of the flow conduit: the larger the diameter, the bigger the gap. An arrangement of this type is appropriate to flowmeters having flow conduits of small diameter such as one inch; but, as will now be explained, it is unsuitable for larger diameters—that is, diameters of two, three and four inches and greater.

The reason why cored solenoids are inappropriate in larger diameter flowmeters will be clear from the basic flowmeter equation:

$$e_{flow} = BLv$$

wherein:

$e_{flow}$ is the flowmeter signal intensity;
B is the magnetic field strength;
L is the diameter of the flow conduit;
v is the flow velocity.

For a constant $e_{flow}/v$ relationship, B is inversely proportional to L. Hence, as the flow conduit diameter L increases with larger meters, one requires a reduction in magnetic field strength, this being accomplished by fewer ampere turns which results in a thinner electromagnet coil. The use of unduly thick coils for a given meter diameter would obviously be wasteful of power, resulting in excessive heat and adding unnecessarily to the cost of the meter.

With larger diameter flow conduits, the air gap becomes the predominant influence on the system permeability, and the effect of cores or pole pieces on this factor becomes less significant. Thus if a meter has a 12 meter diameter flow conduit, the appropriate coil therefor is only a quarter of an inch thick. In this context, a one quarter inch thick pole piece would have a negligible effect on the permeability of the system, and is therefore unnecessary except possibly as a post on which to mount the coil.

SUMMARY OF INVENTION

In view of the foregoing, the main object of this invention is to provide a compact and efficient electromagnetic flowmeter having a cylindrical housing concentric with a spool of a relatively large diameter to define a flow conduit, an electromagnetic field being established by a pair of thin coils disposed at diametrically-opposed positions with respect to the conduit, the coils lying adjacent the inner surface of the housing and having a shape conforming thereto.

A significant feature of the invention is that the thin coils are either coreless or surround short cores integral with the housing. The housing is of ferromagnetic material and functions as a return magnetic path for the electromagnets.

Also an object of the invention is to provide a flowmeter of the above type which operates reliably and efficiently with minimal prior requirements, which meter may be manufactured at low cost and readily installed in a pipe line.

Briefly stated, a flowmeter in accordance with the invention includes a non-magnetic metal spool of high mechanical strength and having end flanges. The inner surface of the spool is covered by an insulating liner to provide a flow conduit for the fluid to be metered, the diameter of the conduit being at least 2 inches.

Surrounding the spool and concentric therewith is a cylindrical housing fabricated of ferromagnetic material and formed of complementary half pieces which include arcuate end plates that join the corresponding end flanges of the spool to define an enclosed inner chamber. Mounted adjacent the inner surface of the half pieces at diametrically-opposed positions along a coil axis that is normal to the longitudinal flow axis of the conduit is a pair of relatively thin electromagnet coils which are shaped to conform to this surface. Supported on the spool at diametrically-opposed positions along an electrode axis at right angles to the coil axis is a pair of electrodes.

The inner chamber is filled with a potting compound to seal the coils and the electrodes therein and thereby provides a highly stable structure, the housing serving as a mold for this purpose.

OUTLINE OF DRAWINGS

For a better understanding of the invention as well as other objects and further features thereof, reference is made to the following detailed description to be read in conjunction with the accompanying drawings, wherein:

FIG. 1 is a transverse section taken through a flangeless electromagnetic flowmeter in accordance with the invention, the spool thereof being omitted;

FIG. 2 is a longitudinal section taken through the flowmeter, the position of the spool being indicated in dotted lines;

FIG. 3 is a separate view of the spool, partly in section;

FIG. 4 is a plan view of one of the electromagnet coils having a saddle-shaped form;

FIG. 5 is a section taken through the coil;

FIG. 6 is a perspective view of the assembled meter, partly cut away to expose the interior; and FIG. 7 is an elevational view of the unit under compression between the flanged ends of upstream and downstream pipes in a flow line.

DESCRIPTION OF INVENTION

Referring now to FIGS. 1, 2 and 3, there is illustrated a flangeless flowmeter unit in accordance with the invention, the unit including a non-magnetic metallic spool 10 of high strength, preferably fabricated of stainless steel, having end flanges 10A and 10B. Spool 29 is provided with an insulating liner 11 and acts as the flow conduit for the meter. The spool has the same or a smaller inner diameter as that of the adjacent piping.

Spool 10 must be capable of withstanding not only the pressure of the fluid being metered but also the compressive force to which it is subjected. This force is generated by bolts which bridge the flanges of the upstream and downstream pipes between which the unit is interposed in a fluid line (see FIG. 7).

Tubular liner 11 disposed within spool 10 is formed of synthetic plastic material or a fiber glass composition and is provided with end flanges 11A and 11B which overlie end flanges 10A and 10B of the spool. The liner is preferably injection molded of a material such as KYNAR and includes diametrically-opposed sockets $S_1$ and $S_2$ to accommodate the metal electrodes of the meter (not shown). The electrodes lie on an axis X which is perpendicular to the longitudinal flow axis Z.

Surrounding the lined metal spool 10 and concentric therewith is a split cylindrical housing or casing formed by complementary half-pieces $12_u$ and 12l, the longitudinal edges of these pieces being seam welded or otherwise joined together to complete the housing. Housing $12_u$–12l is fabricated of carbon steel or other "soft" ferromagnetic material.

Integral with housing pieces $12_u$ and 12l are short magnet cores 13 and 14 formed of the same cast steel material, the cores being at diametrically-opposed positions along a coil axis Y normal to longitudinal flow axis Z which is also the axis of the cylindrical housing. Coil axis Y is at right angles to electrode axis X, so that the axes of the meter are mutually perpendicular. The cores have an arcuate formation which follows the curvature of the housing half-pieces.

Received over the cores are saddle-shaped coils 15 and 16, one of which is shown in FIGS. 4 and 5. These coils are pre-formed and preferably lead-shielded so that they can be slipped over the cores to form electromagnets. When excited, these electromagnets establish an electromagnetic field whose lines of flux are at right angles to the direction of fluid flow, whereby when the fluid passing through the spool intercepts this field, a voltage is induced therein which is picked up by the electrodes to generate a signal that is a function of flow rate.

The leads for the electrodes and for the electromagnets pass out of the unit in the associated converter assembly through bores 17 and 18 in the upper housing piece $12_u$. Bores 18 and 19 register with the bores 19 and 20, respectively, in a bracket 21 welded to housing piece $12_u$. The bracket serves to support a converter box (not shown) housing the electronic drive circuit for exciting the electromagnet, circuits for conditioning the signal derived from the electrodes and all other circuits normally associated with an electromagnetic flowmeter primary to provide an output signal suitable for transmission to a remote station, for indicating and recording the metered flow rate and for carrying out process control operations.

The opposite ends of the split housing are provided with annular closure plates 22 and 23 whose inner peripheries mate with the outer peripheries of end flanges 10A and 10B of the spool to define an enclosed inner chamber in the space between the spool and the housing.

All parts of the meter are properly located and symmetrically disposed with respect to the X-Y-Z axis, and are held within the inner chamber when assembling the unit. It then becomes possible to introduce a flowing potting compound of epoxy or other insulating material into the inner chamber through holes 17 or 18 in the housing, and thereby produce, when the compound is cured, a protected, moisture-free unit capable of functioning reliably and efficiently for an indefinite period.

Thus the split housing functions not only as the mechanical support for the converter assembly but it also affords the magnetic flux return path for the electromagnets. Moreover, it provides the means for locating the various subassemblies, spools, leads, magnet parts, etc. Not only does this housing afford a weatherproof enclosure for the meter, but it also acts as a mold for potting the inner chamber.

As shown in FIG. 7, the flowmeter unit is interposed between the upstream and downstream pipes 24 and 25 of a fluid line. The pipes are provided with end flanges 24A and 25A having bolt holes therein to accommodate a set of bolts 26 which bridge the flanges and encage the unit. In order to effect a good fluid seal, the unit is subjected to a high compressive force by the bolt torque. But because of the high strength of the metal spool, the unit is capable of withstanding this force.

The electrodes used with the meter may be conventional small diameter wetted electrodes. Alternatively, large area insulated electrodes may be used, with or without shields. As pointed out previously, the permeability role played by the core of the electromagnet becomes less significant for thin coils in large diameter flow conduit meters. The thinness of the coil in large diameter meters may be such as to dispense with the need for cores, the coils in all instances lying adjacent the surface of the housing pieces and conforming to the curvature thereof.

While there has been shown and described a preferred embodiment of a unitary electromagnetic flowmeter with sealed coils in accordance with the invention, it will be appreciated that many changes and modifications may be made therein without, however, departing from the essential spirit thereof. Thus while saddle-shaped coils have been shown, in practice, these coils may have a diamond or circular configuration, the coils being shaped to conform to the curvature of the housing.

I claim:

1. An electromagnetic flowmeter unit interposable between the flanged ends of upstream and downstream pipes in a line carrying a fluid whose flow rate is to be measured, the flanged ends being bridged by bolts which encage the unit and subject it to a compressive force to effect a fluid seal, said unit comprising:

A a non-magnetic metal spool having end flanges to provide a flow conduit having a longitudinal flow axis, said spool having a strength sufficient to withstand the pressure of the fluid and said compressive force;

B an insulating inner liner for said spool;

C a cylindrical housing formed of ferromagnetic material surrounding said spool and concentric therewith, said housing having end plates mating with the flanges of the spool to create an annular inner chamber between the spool and the housing;

D a pair of thin coils in said chamber adjacent the inner surface of the housing at diametrically opposed positions with respect to said flow conduit, said coils surrounding a coil axis intersecting said flow axis at right angles thereto; and E a pair of electrodes mounted on said spool at diametrically-opposed positions along an electrode axis which is perpendicular both to the flow axis and the coil axis, said inner chamber being filled with a potting compound to seal said coils and said electrodes therein.

2. A unit as set forth in claim 1, wherein said liner is injection molded of plastic material and has end flanges which overlie the end flanges of the spool.

3. A unit as set forth in claim 1, wherein said coils have a saddle-shaped form and are symmetrically disposed with respect to the coil axis.

4. A unit as set forth in claim 3, wherein said coils are received on saddle-shaped short cores integral with said housing.

5. A unit as set forth in claim 1, wherein said housing is formed of complementary half pieces which are joined together.

6. A unit as set forth in claim 1, wherein said spool is made of stainless steel.

7. A unit as set forth in claim 1, wherein said housing is made of carbon steel.

* * * * *